(12) United States Patent
Kani et al.

(10) Patent No.: US 12,126,221 B2
(45) Date of Patent: Oct. 22, 2024

(54) ROTOR AND ROTATING ELECTRIC MACHINE

(71) Applicant: DENSO CORPORATION, Kariya (JP)

(72) Inventors: Kenji Kani, Kariya (JP); Kenta Gotou, Kariya (JP)

(73) Assignee: DENSO CORPORATION, Kariya (JP)

( * ) Notice: Subject to any disclaimer, the term of this patent is extended or adjusted under 35 U.S.C. 154(b) by 294 days.

(21) Appl. No.: 17/547,930

(22) Filed: Dec. 10, 2021

(65) Prior Publication Data

US 2022/0103035 A1  Mar. 31, 2022

Related U.S. Application Data

(63) Continuation of application No. PCT/JP2020/020452, filed on May 25, 2020.

(30) Foreign Application Priority Data

Jun. 10, 2019 (JP) .................................. 2019-107883

(51) Int. Cl.
 *H02K 1/28* (2006.01)
 *H02K 1/2783* (2022.01)
 *H02K 21/14* (2006.01)

(52) U.S. Cl.
 CPC ............. *H02K 1/2783* (2022.01); *H02K 1/28* (2013.01); *H02K 21/14* (2013.01)

(58) Field of Classification Search
 CPC .................................. H02K 1/28; H02K 21/14
 (Continued)

(56) References Cited

U.S. PATENT DOCUMENTS 10,122,227 B1 * 11/2018 Long ..................... H02K 1/2783
11,196,310 B2 * 12/2021 Saban ..................... H02K 21/14
(Continued)

FOREIGN PATENT DOCUMENTS

JP 2000-197287 A 7/2000
JP 2007-014110 A 1/2007
(Continued)

OTHER PUBLICATIONS

Jul. 21, 2020 International Search Report issued in International Application No. PCT/JP2020/020452.

*Primary Examiner* — Alexander Talpalatski
(74) *Attorney, Agent, or Firm* — Oliff PLC

(57) ABSTRACT

A rotor includes a rotating shaft, a core and a Halbach array magnet. The Halbach array magnet has first magnet portions each having its magnetization direction oriented along a radial direction and second magnet portions each having its magnetization direction oriented along a circumferential direction. The first magnet portions and the second magnet portions are alternately arranged in the circumferential direction. The core has a shaft-fixed portion, a yoke portion and a plurality of connection portions. The connection portions are arranged in the circumferential direction with gaps formed therebetween. On an inner circumferential surface of the yoke portion, there are formed additional-function portions to extend radially inward from the inner circumferential surface of the yoke portion. Each of the additional-function portions is located radially inside a corresponding one of the second magnet portions and has an additional function in addition to a function of forming the magnetic path.

9 Claims, 3 Drawing Sheets

(58) Field of Classification Search
USPC .................................................... 310/156.55
See application file for complete search history.

(56) References Cited

U.S. PATENT DOCUMENTS

| | | | |
|---|---|---|---|
| 2005/0040721 A1* | 2/2005 | Kusase | H02K 1/32 |
| | | | 310/156.43 |
| 2014/0084731 A1* | 3/2014 | Iwami | H02K 1/02 |
| | | | 310/156.07 |
| 2015/0061440 A1* | 3/2015 | Catalan | H02K 16/00 |
| | | | 310/156.01 |
| 2015/0357870 A1* | 12/2015 | Hazeyama | H02K 1/2766 |
| | | | 310/156.07 |
| 2016/0036281 A1* | 2/2016 | Nakano | H02K 29/03 |
| | | | 310/68 D |

FOREIGN PATENT DOCUMENTS

| | | |
|---|---|---|
| JP | 2008-086166 A | 4/2008 |
| JP | 2009-038968 A | 2/2009 |
| JP | 2010-011738 A | 1/2010 |
| JP | 2010-098891 A | 4/2010 |
| JP | 2010-178493 A | 8/2010 |
| JP | 2015-027208 A | 2/2015 |
| JP | 2015-231254 A | 12/2015 |

* cited by examiner

ROTOR AND ROTATING ELECTRIC MACHINE

CROSS-REFERENCE TO RELATED APPLICATIONS

The present application is a continuation application of International Application No. PCT/JP2020/020452 filed on May 25, 2020, which is based on and claims priority from Japanese Patent Application No. 2019-107883 filed on Jun. 10, 2019. The entire contents of these applications are incorporated by reference into the present application.

BACKGROUND

1 Technical Field

The present disclosure relates to rotors and rotating electric machines.

2 Description of Related Art

Conventionally, there are rotors that include a Halbach array magnet provided on a core, for example as disclosed in Japanese Patent Application Publication No. JP 2007-014110 A. The Halbach array magnet has a plurality of first magnet portions each having its magnetization direction oriented along a radial direction and a plurality of second magnet portions each having its magnetization direction oriented along a circumferential direction. Moreover, the first magnet portions and the second magnet portions are alternately arranged in the circumferential direction.

SUMMARY

The inventors of the present application have investigated how to secure, in a rotor including a Halbach array magnet as described above, a magnetic path in a core, i.e., secure a desired output while removing part of the material and thereby reducing the weight of a back yoke portion of the core.

The present disclosure has been accomplished based on the results of the investigation by the inventors.

According to a first aspect of the present disclosure, a rotor includes a rotating shaft, a core provided on the rotating shaft so as to be rotatable together with the rotating shaft, and a Halbach array magnet fixed to the core. The Halbach array magnet has a plurality of first magnet portions each having its magnetization direction oriented along a radial direction and a plurality of second magnet portions each having its magnetization direction oriented along a circumferential direction. The first magnet portions and the second magnet portions are alternately arranged in the circumferential direction. The core has a tubular shaft-fixed portion fixed to the rotating shaft, a tubular yoke portion located radially outside the shaft-fixed portion and radially inside the Halbach array magnet to form a magnetic path, and a plurality of connection portions extending radially outward from the shaft-fixed portion so as to be connected with the yoke portion. The connection portions are arranged in the circumferential direction with gaps formed therebetween. On an inner circumferential surface of the yoke portion, there are formed additional-function portions to extend radially inward from the inner circumferential surface of the yoke portion. Each of the additional-function portions is located radially inside a corresponding one of the second magnet portions and has an additional function in addition to a function of forming the magnetic path.

According to a second aspect of the present disclosure, a rotating electric machine includes an annular stator and a rotor provided inside the stator. The rotor includes a rotating shaft, a core provided on the rotating shaft so as to be rotatable together with the rotating shaft, and a Halbach array magnet fixed to the core. The Halbach array magnet has a plurality of first magnet portions each having its magnetization direction oriented along a radial direction and a plurality of second magnet portions each having its magnetization direction oriented along a circumferential direction. The first magnet portions and the second magnet portions are alternately arranged in the circumferential direction. The core has a tubular shaft-fixed portion fixed to the rotating shaft, a tubular yoke portion located radially outside the shaft-fixed portion and radially inside the Halbach array magnet to form a magnetic path, and a plurality of connection portions extending radially outward from the shaft-fixed portion so as to be connected with the yoke portion. The connection portions are arranged in the circumferential direction with gaps formed therebetween. On an inner circumferential surface of the yoke portion, there are formed additional-function portions to extend radially inward from the inner circumferential surface of the yoke portion. Each of the additional-function portions is located radially inside a corresponding one of the second magnet portions and has an additional function in addition to a function of forming the magnetic path.

In the above-described rotor and rotating electric machine according to the present disclosure, the magnetic path of the Halbach array magnet can be formed in the additional-function portions provided on the inner circumferential surface of the yoke portion. Consequently, it becomes possible to reduce the radial thickness of the other parts of the yoke portion than the additional-function portions and thereby reduce the weight of the core while alleviating magnetic saturation in the yoke portion and thereby securing the output.

DESCRIPTION OF EMBODIMENTS

Hereinafter, a rotor and a rotating electric machine according to an exemplary embodiment will be described.

Figure 1:
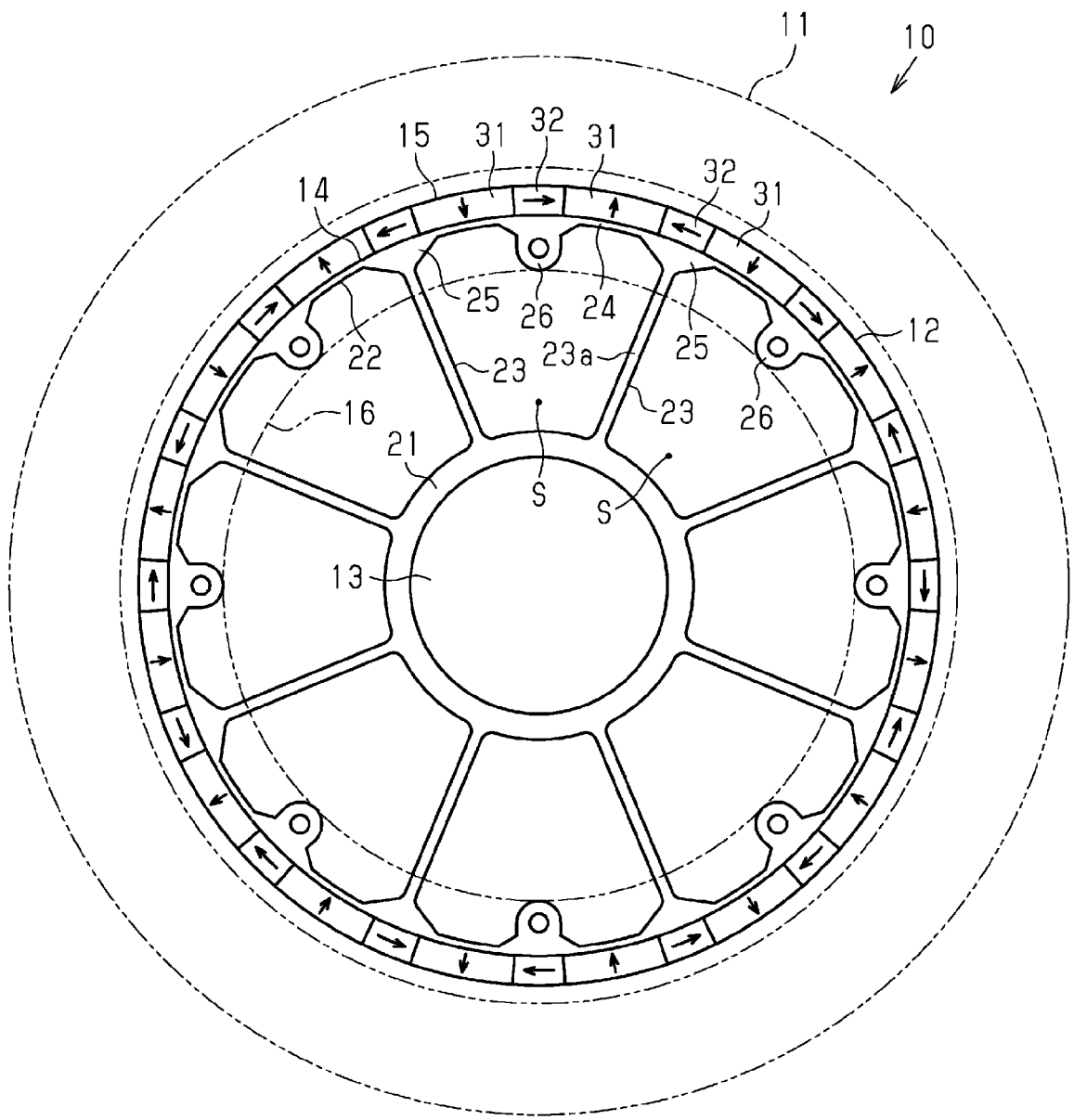
FIG. 1 is a plan view of a rotating electric machine according to an exemplary embodiment.
Figure 2:
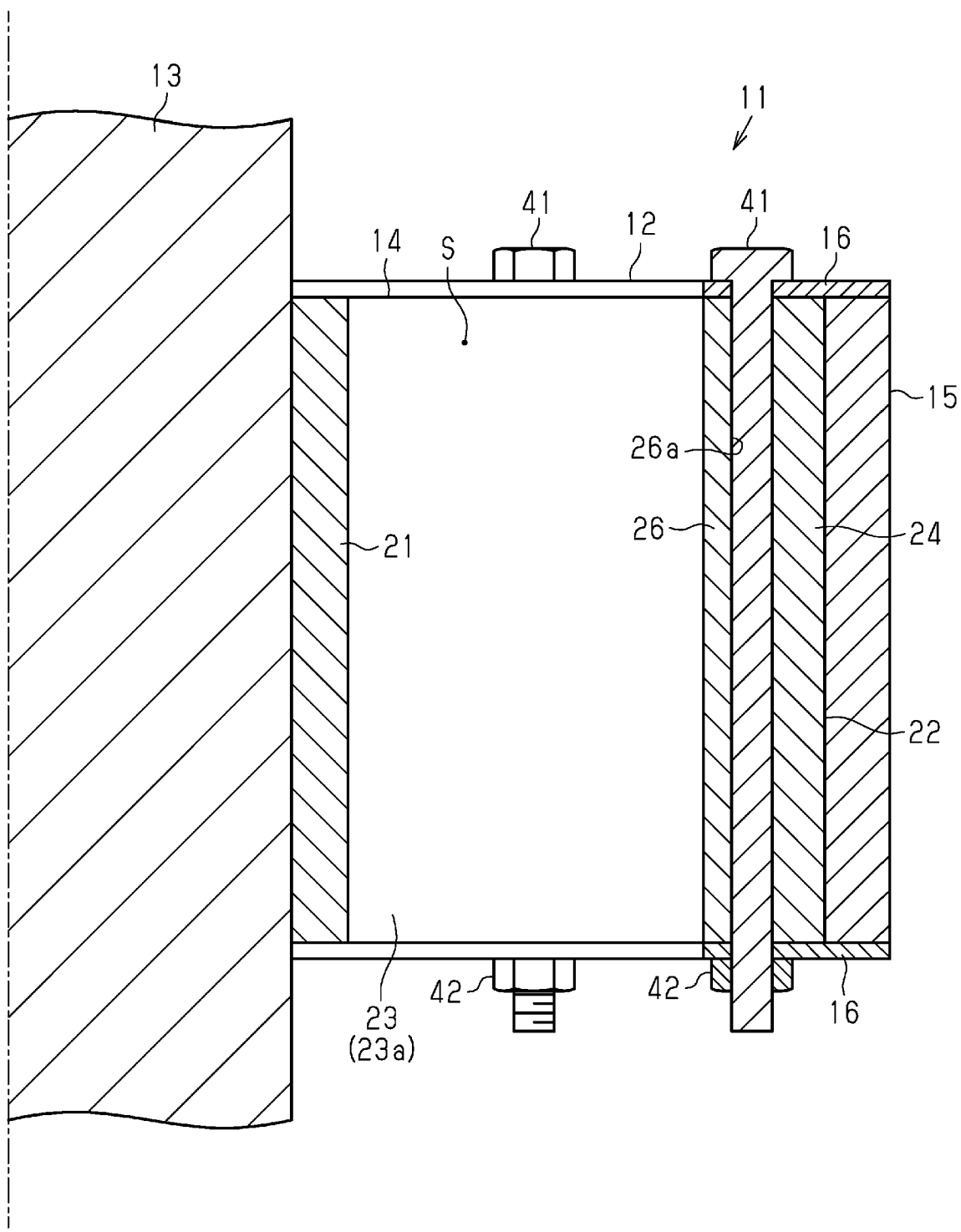
FIG. 2 is a partial cross-sectional view of a rotor according to the embodiment.

As shown in FIGS. 1 and 2, the rotating electric machine 10 according to the present embodiment includes a cylindrical stator 11 and a rotor 12 rotatably provided radially inside the stator 11. The rotor 12 includes a rotating shaft 13, a core 14 provided on the rotating shaft 13 so as to be rotatable together with the rotating shaft 13, a Halbach array magnet 15 provided on the core 14, and a pair of cover members 16 fixed respectively on opposite axial sides of the core 14.

Configuration of Core 14

The core 14 is formed of a magnetic material. In the present embodiment, the core 14 has a configuration where a plurality of magnetic steel sheets (not shown in the drawings) are laminated in the axial direction; the magnetic steel sheets are formed by press working from a metal plate. The core 14 has a shaft-fixed portion 21 fixed to the rotating shaft 13, a magnet-supporting portion 22 that supports the Halbach array magnet 15, and a plurality of connection portions 23 that connect the shaft-fixed portion 21 and the magnet-supporting portion 22.

The shaft-fixed portion 21 has a substantially cylindrical shape. The rotating shaft 13 is inserted and fixed inside the shaft-fixed portion 21. Consequently, the shaft-fixed portion 21 is configured to be rotatable together with the rotating shaft 13. The magnet-supporting portion 22 has a substantially cylindrical shape and is formed on the outer peripheral side of the shaft-fixed portion 21. The magnet-supporting portion 22 is supported by the plurality of connection portions 23 that radially extend from the outer peripheral surface of the shaft-fixed portion 21. The plurality of connection portions 23 are provided at equal intervals in the circumferential direction. Moreover, gaps S are formed between the connection portions 23 in the circumferential direction; the gaps S penetrate the core 14 in the axial direction. Each of the connection portions 23 serves to fix the magnet-supporting portion 22 to the shaft-fixed portion 21. In other words, each of the connection portions 23 serves to transmit torque generated at the magnet-supporting portion 22 to the rotating shaft 13.

Configuration of Halbach Array Magnet 15

As shown in FIG. 1, the Halbach array magnet 15 is configured to have a plurality of first magnet portions 31 and a plurality of second magnet portions 32 arranged alternately along the circumferential direction. In addition, in FIG. 1, arrows depicted in the magnet portions 31 and 32 indicate the magnetization directions (or the directions of magnetization) of the magnet portions 31 and 32; and the start-point side and the end-point side of each of the arrows respectively correspond to the S pole and the N pole.

Each of the first magnet portions 31 is magnetized along a radial direction. Moreover, the first magnet portions 31 are arranged at equal intervals in the circumferential direction so as to respectively correspond to magnetic poles of the rotor 12. Furthermore, the first magnet portions 31 are magnetized so that the polarities of the magnetic poles of the rotor 12 are alternately different in the circumferential direction. That is, the magnetization directions of each circumferentially-adjacent pair of the first magnet portions 31 are opposite to each other.

Figure 3:
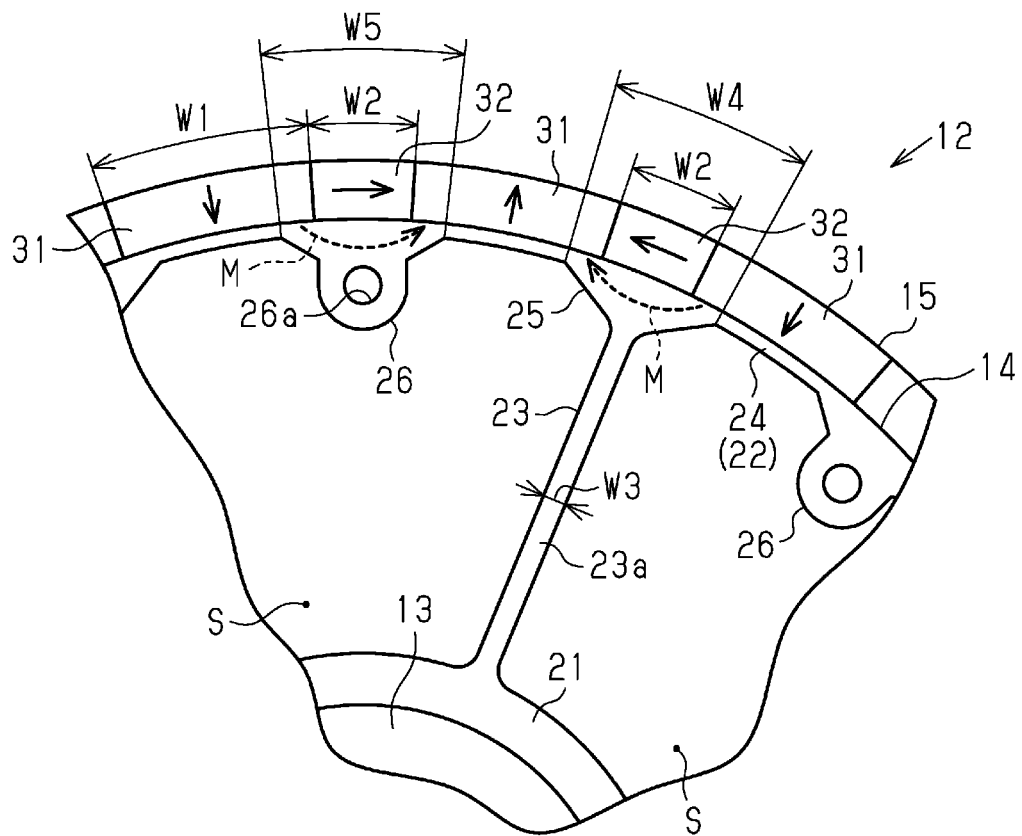
FIG. 3 is an enlarged plan view of part of the rotor according to the embodiment.

Each of the second magnet portions 32 is provided between a circumferentially-adjacent pair of the first magnet portions 31 having different polarities from each other. The second magnet portions 32 are also arranged at equal intervals in the circumferential direction. Moreover, as shown in FIG. 3, in the present embodiment, the circumferential dimension W2 of each of the second magnet portions 32 (in other words, the opening angle of each of the second magnet portions 32 about the rotation axis of the rotor 12) is set to be smaller than the circumferential dimension W1 of each of the first magnet portions 31 (in other words, the opening angle of each of the first magnet portions 31 about the rotation axis of the rotor 12).

Each of the second magnet portions 32 is magnetized along the circumferential direction. Specifically, the magnetization direction of each of the second magnet portions 32 is set such that the N-pole side of the second magnet portion 32 faces one of the first magnet portions 31 which forms an N pole (i.e., one of the first magnet portions 31 which has an N pole appearing on the outer peripheral side) and the S-pole side of the second magnet portion 32 faces one of the first magnet portions 31 which forms an S pole (i.e., one of the first magnet portions 31 which has an S pole appearing on the outer peripheral side).

In addition, each circumferentially-adjacent pair of the first magnet portion 31 and the second magnet portions 32 may be arranged either in direct contact with each other or apart from each other in the circumferential direction. Moreover, each of the first magnet portions 31 may be constituted of either a single magnet or a plurality of magnets. Similarly, each of the second magnet portions 32 may be constituted of either a single magnet or a plurality of magnets.

The magnet-supporting portion 22 of the core 14 includes an annular yoke portion 24 that abuts the Halbach array magnet 15 on the inner peripheral side thereof. The yoke portion 24 functions as a back yoke in the rotor 12.

Configuration of Connection Portions 23

As shown in FIGS. 1 and 3, the radially outer ends of the connection portions 23 of the core 14 are integrally connected with the inner circumferential surface of the yoke portion 24. Moreover, each of the connection portions 23 that radially extend is located radially inside a corresponding one of the second magnet portions 32 of the Halbach array magnet 15. That is, connecting portions 25 (i.e., the radially outer ends of the connection portions 23), which respectively connect the connection portions 23 with the yoke portion 24, are located radially inside the corresponding second magnet portions 32. In addition, in the present embodiment, the number of the connection portions 23 is set to half the number of the second magnet portions 32.

Moreover, in the present embodiment, the circumferential center of each of the connection portions 23 coincides with the circumferential center of the corresponding second magnet portion 32. Further, as shown in FIG. 3, an intermediate part 23a of each of the connection portions 23 has a constant width along the radial direction; and the width W3 of the intermediate part 23a is set to be smaller than the circumferential dimension W2 of each of the second magnet portions 32.

Each of the connecting portions 25 has a tapered shape such that the circumferential dimension thereof increases toward the yoke portion 24, i.e., toward the radially outer side. Moreover, as shown in FIG. 3, the circumferential dimension W4 of each of the connecting portions 25 at the radially outer end thereof is set to be larger than the circumferential dimension W2 of each of the second magnet portions 32. In addition, as a matter of course, the circumferential dimension W4 of each of the connecting portions 25 at the radially outer end thereof is larger than the width W3 of each of the intermediate parts 23a of the connection portions 23.

Configuration of Cover-Fixing Portions 26

On the inner circumferential surface of the yoke portion 24, there are formed a plurality of cover-fixing portions 26 for fixing the cover members 16 (see FIGS. 1 and 2) to the core 14. Each of the cover-fixing portions 26 protrudes radially inward from the inner circumferential surface of the yoke portion 24.

Each of the cover-fixing portions 26 is located radially inside a corresponding one of the second magnet portions 32 of the Halbach array magnet 15. The cover-fixing portions 26 are formed at equal intervals in the circumferential direction. In the present embodiment, the number of the cover-fixing portions 26 is set to half the number of the second magnet portions 32 (i.e., to be equal to the number of the connection portions 23). The cover-fixing portions 26 and the connection portions 23 are alternately arranged in the circumferential direction. That is, on the radially inner side of each of the second magnet portions 32, there is located one of the connection portions 23 or one of the cover-fixing portions 26. Moreover, the main part (i.e., the part other than the connection portions 25 and the cover-fixing portions 26) of the yoke portion 24 is formed to have a uniform inner diameter. In addition, the main part of the yoke portion 24 is formed to be radially thinner than the connection portions 25 and the cover-fixing portions 26.

In addition, in the present embodiment, the circumferential dimension W5 of each of the cover-fixing portions 26 at the radially outer end thereof is set to be larger than the circumferential dimension W2 of each of the second magnet portions 32. Moreover, the circumferential center of each of the cover-fixing portions 26 coincides with the circumferential center of the corresponding second magnet portion 32.

As shown in FIG. 2, each of the cover-fixing portions 26 extends over the entire axial length of the yoke portion 24. Moreover, in each of the cover-fixing portions 26, there is formed a bolt insertion hole 26a so as to penetrate the cover-fixing portion 26 in the axial direction. In the bolt insertion hole 26a, there is inserted a through-bolt 41 with a distal end portion thereof axially protruding from the bolt insertion hole 26a. Further, on the distal end portion of the through-bolt 41, there is screwed a nut 42. Consequently, the pair of cover members 16 are sandwiched between the head of the through-bolt 41 and the nut 42 and thereby fixed respectively to opposite axial ends of the core 14.

Each of the cover members 16 is a plate-shaped member which has an annular shape in an axial view (see FIG. 1). The cover members 16 are provided to respectively cover opposite axial ends of the Halbach array magnet 15 in the axial direction. Specifically, each of the cover members 16 is formed to have a radial size capable of covering from the cover-fixing portions 26 to the Halbach array magnet 15. Consequently, it becomes possible to suppress axial detachment of the magnet portions 31 and 32 of the Halbach array magnet 15.

The operation of the present embodiment will be described.

The radial thickness of the yoke portion 24 of the core 14 is set to be larger at those parts of the yoke portion 24 which respectively form the connection portions 25 and the cover-fixing portions 26 on the radially inner side of the second magnet portions 32 of the Halbach array magnet 15 and smaller at the other parts of the yoke portion 24. Consequently, it becomes possible to reduce the radial thickness of the yoke portion 24 (i.e., to radially expand the spaces S) and thereby reduce the weight of the core 14 while securing the magnetic path M of the Halbach array magnet 15 and thereby suppressing magnetic saturation.

The connection portions 25 are configured as additional-function portions (or multi-function portions) that have, in addition to the function of forming the magnetic path M, the function of fixing the magnet-supporting portion 22, which includes the yoke portion 24, to the shaft-fixed portion 21. Moreover, the cover-fixing portions 26 are also configured as additional-function portions (or multi-function portions) that have, in addition to the function of forming the magnetic path M, the function of fixing the cover members 16 to the core 14. That is, the connection portions 25 and the cover-fixing portions 26 are portions where the radial thickness of the yoke portion 24 must be large enough to allow the connecting portions 25 and the cover-fixing portions 26 to have the aforementioned functions. Consequently, by arranging the connecting portions 25 and the cover-fixing portions 26 as the additional-function portions on the radially inner side of the second magnet portions 32, it becomes possible to realize a lean and efficient configuration of the rotor 12.

The advantageous effects of the present embodiment will be described.

(1) On the inner circumferential surface of the yoke portion 24, there are formed the connecting portions 25 to extend radially inward from the inner circumferential surface of the yoke portion 24; each of the connecting portions 25 is located radially inside a corresponding one of the second magnet portions 32 and connects a corresponding one of the connection portions 23 with the yoke portion 24. Moreover, on the inner circumferential surface of the yoke portion 24, there are also formed the cover-fixing portions 26 to extend radially inward from the inner circumferential surface of the yoke portion 24; each of the cover-fixing portions 26 is located radially inside a corresponding one of the second magnet portions 32 and provided for fixing the cover members 16 to the core 14.

In this manner, the magnetic path M (see FIG. 3) of the Halbach array magnet 15 can be formed in the connecting portions 25 and the cover-fixing portions 26 which are provided as the additional-function portions on the inner circumferential surface of the yoke portion 24. Consequently, it becomes possible to reduce the radial thickness of the other parts of the yoke portion 24 than the connecting portions 25 and the cover-fixing portions 26 and thereby reduce the weight of the core 14 while alleviating magnetic saturation in the yoke portion 24 and thereby securing the output.

(2) In order to reduce the weight of the core 14, the gaps S are formed by leaving only the connection portions 23 that connect the shaft-fixed portion 21 and the magnet-supporting portion 22 while removing the other pars (i.e., the parts between the connection portions 23). That is, in the core 14, the connection portions 23 are essential portions for fixing the magnet-supporting portion 22 to the shaft-fixed portion 21. By utilizing the connection portions 23 (more specifically, the connecting portions 25) for formation of the magnetic path M (see FIG. 3), it becomes possible to realize a lean and efficient configuration of the rotor 12.

(3) As shown in FIG. 3, with the circumferential dimension W4 of each of the connecting portions 25 at the radially outer end thereof set to be larger than the circumferential dimension W2 of each of the second magnet portions 32, it becomes possible to more suitably suppress magnetic saturation in the yoke portion 24. Further, in the present embodiment, each of the connecting portions 25 is configured to radially overlap a corresponding one of the second magnet portions 32 and a pair of the first magnet portions 31 circumferentially adjacent to the corresponding second magnet portion 32. Consequently, it becomes possible to further suppress magnetic saturation in the yoke portion 24.

(4) Each of the connecting portions 25 has a tapered shape such that the circumferential dimension thereof increases toward the radially outer side. That is, each of the connecting portions 25 is shaped along the magnetic path M. Consequently, it becomes possible to more suitably suppress magnetic saturation in the yoke portion 24 while minimizing the size of the connecting portions 25 and thereby reducing the weight of the core 14.

(5) As shown in FIG. 2, the rotor 12 includes the pair of cover members 16 assembled respectively to opposite axial ends of the core 14. Moreover, each of the cover-fixing portions 26 for fixing the cover members 16 to the core 14 is located radially inside a corresponding one of the second magnet portions 32. The cover-fixing portions 26 are essential portions for fixing the cover members 16 to the core 14. By utilizing the cover-fixing portions 26 for formation of the magnetic path M, it becomes possible to realize a lean and efficient configuration of the rotor 12.

(6) Each of the cover-fixing portions 26 has the bolt insertion hole 26a formed to axially penetrate the cover-fixing portion 26. The cover members 16 are fastened to the core 14 by the through-bolts 41 inserted respectively in the bolt insertion holes 26a of the cover-fixing portions 26 and the nuts 42 screwed respectively on the through-bolts 41. Therefore, the cover-fixing portions 26 are required to have a certain radial thickness. By utilizing such cover-fixing portions 26 for formation of the magnetic path M, it becomes possible to more suitably suppress magnetic saturation in the yoke portion 24.

(7) As shown in FIG. 3, the circumferential dimension W2 of each of the second magnet portions 32 is set to be smaller than the circumferential dimension W1 of each of the first magnet portions 31. Consequently, it becomes possible to set the circumferential dimension W4 of each of the connecting portions 25 and the circumferential dimension W5 of each of the cover-fixing portions 26 to be larger than the circumferential dimension W2 of each of the second magnet portions 32 while minimizing the circumferential dimensions W4 and W5. As a result, it becomes possible to further reduce the weight of the core 14.

The present embodiment can also be modified and implemented as follows. Moreover, the present embodiment and the following modifications can be combined with each other to the extent that there is no technical contradiction between them.

Figure 4:
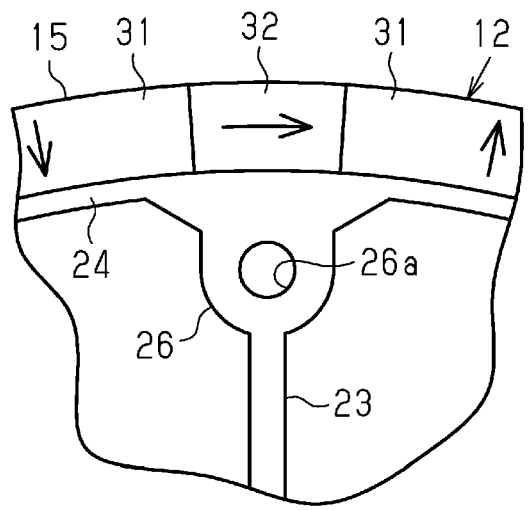
FIG. 4 is an enlarged plan view of part of a rotor according to a modification.

In the above-described embodiment, the connection portions 23 are provided at different circumferential positions from the cover-fixing portions 26. Alternatively, as shown in FIG. 4, each of the connection portions 23 may be provided at the same circumferential position as a corresponding one of the cover-fixing portions 26. Specifically, in the configuration shown in FIG. 4, each of the connection portions 23 has a radially-outer end portion thereof connected integrally with the corresponding cover-fixing portion 26. In other words, the connection portions 23 have the function of the cover-fixing portions 26, i.e., respectively have the bolt insertion holes 26a. With this configuration, the connection portions 23 are provided with more functions, contributing to further reduction in the weight of the core 14.

In the above-described embodiment, the circumferential dimension W2 of each of the second magnet portions 32 is set to be smaller than the circumferential dimension W1 of each of the first magnet portions 31. However, the circumferential dimension W2 of each of the second magnet portions 32 may alternatively be set to be equal to the circumferential dimension W1 of each of the first magnet portions 31.

In the above-described embodiment, the circumferential dimension W4 of each of the connecting portions 25 at the radially outer end thereof is set to be larger than the circumferential dimension W2 of each of the second magnet portions 32. However, the circumferential dimension W4 of each of the connecting portions 25 at the radially outer end thereof may alternatively be set to be smaller than or equal to the circumferential dimension W2 of each of the second magnet portions 32.

In the above-described embodiment, the circumferential center of each of the connecting portions 25 coincides with the circumferential center of a corresponding one of the second magnet portions 32. However, the present disclosure is not limited to this configuration; it is only necessary for each of the connecting portions 25 to have a part thereof radially overlapping the corresponding second magnet portion 32.

In the above-described embodiment, each of the connecting portions 25 has the tapered shape expanding radially outward; thus the circumferential dimension W4 of each of the connecting portions 25 at the radially outer end thereof is larger than the width W3 of each of the intermediate parts 23a of the connection portions 23. However, the present disclosure is not limited to this configuration; the width W3 may be kept constant also over each of the connecting portions 25.

In the above-described embodiment, the circumferential dimension W5 of each of the cover-fixing portions 26 at the radially outer end thereof is set to be larger than the circumferential dimension W2 of each of the second magnet portions 32. However, the circumferential dimension W5 of each of the cover-fixing portions 26 at the radially outer end thereof may alternatively be set to be smaller than or equal to the circumferential dimension W2 of each of the second magnet portions 32.

In the above-described embodiment, the circumferential center of each of the cover-fixing portions 26 coincides with the circumferential center of a corresponding one of the second magnet portions 32. However, the present disclosure is not limited to this configuration; it is only necessary for each of the cover-fixing portions 26 to have a part thereof radially overlapping the corresponding second magnet portion 32.

Although not particularly mentioned in the above-described embodiment, the magnet portions 31 and 32 of the Halbach array magnet 15 may be fixed to the magnet-supporting portion 22 by any suitable method. For example, the magnet portions 31 and 32 of the Halbach array magnet 15 may be fixed to the outer circumferential surface of the yoke portion 24 of the magnet-supporting portion 22 by an adhesive or the like. In this case, to prevent the magnet portions 31 and 32 from being detached radially outward, it is preferable to provide a tubular cover on the radially outer side of the magnet portions 31 and 32. In addition, axial detachment of the magnet portions 31 and 32 can be suppressed by the cover members 16. As an alternative, a plurality of magnet-fixing holes may be formed in the magnet-supporting portion 22 so as to extend in the axial direction; and the magnet portions 31 and 32 may be respectively inserted and fixed by an adhesive or the like in the magnet-fixing holes.

In the above-described embodiment, the cover members 16 are fixed to the core 14 by the through-bolts 41 inserted respectively in the bolt insertion holes 26a of the cover-fixing portions 26 and the nuts 42 screwed respectively on the through-bolts 41. However, the present disclosure is not limited to this configuration. For example, internal threads may be formed in the cover-fixing portions 26 to engage with external threads formed on the bolts; and the cover members 16 may be fixed to the core 14 through engagement between the external threads of the bolts and the internal threads of the cover-fixing portions 26.

In the above-described embodiment, the number of poles of the rotor 12 (i.e., the number of the first magnet portions 31) and the number of the second magnet portions 32 arranged between the first magnet portions 31 may be suitably changed depending on the design specification of the rotating electric machine 10.

Although not particularly mentioned in the above-described embodiment, each of the boundaries between the first magnet portions 31 and the second magnet portions 32 in an axial view may be configured to extend along either a radial direction of the rotor 12 or a direction intersecting the radial direction of the rotor 12.

In the above-described embodiment, the number of the connection portions 23 and the number of the cover-fixing portions 26 may be suitably changed depending on the design specification of the rotating electric machine 10. Moreover, in the above-described embodiment, the sum of the number of the connection portions 23 and the number of the cover-fixing portions 26 is set to be equal to the number of the second magnet portions 32. However, the sum of the number of the connection portions 23 and the number of the cover-fixing portions 26 may alternatively be set to be smaller or larger than the number of the second magnet portions 32. Furthermore, in the above-described embodiment, each of the second magnet portions 32 has one of the connection portions 23 or one of the cover-fixing portions 26 located on the radially inner side thereof. Alternatively, some of the second magnet portions 32 may have neither the connection portions 23 nor the cover-fixing portions 26 located on the radially inner side thereof.

While the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

What is claimed is:

1. A rotor comprising:
a rotating shaft;
a core provided on the rotating shaft so as to be rotatable together with the rotating shaft; and
a Halbach array magnet fixed to the core,
wherein
the Halbach array magnet has a plurality of first magnet portions each having its magnetization direction oriented along a radial direction and a plurality of second magnet portions each having its magnetization direction oriented along a circumferential direction, the first magnet portions and the second magnet portions being alternately arranged in the circumferential direction,
the core has a tubular shaft-fixed portion fixed to the rotating shaft, a tubular yoke portion located radially outside the shaft-fixed portion and radially inside the Halbach array magnet to form a magnetic path, and a plurality of connection portions extending radially outward from the shaft-fixed portion so as to be connected with the yoke portion,
the connection portions are arranged in the circumferential direction with gaps formed therebetween, and
on an inner circumferential surface of the yoke portion, there are formed additional-function portions to extend radially inward from the inner circumferential surface of the yoke portion, each of the additional-function portions being located radially inside a corresponding one of the second magnet portions and having an additional function in addition to a function of forming the magnetic path, and
wherein a virtual line drawn in the radial direction through each of the connection portions passes through the second magnet portions and does not pass through the first magnet portions.

2. The rotor as set forth in claim 1, wherein
the additional-function portions comprise connecting portions that respectively connect the connection portions with the yoke portion.

3. The rotor as set forth in claim 2, wherein
a circumferential dimension of each of the connecting portions is larger than a circumferential dimension of each of the second magnet portions.

4. The rotor as set forth in claim 2, wherein
each of the connecting portions has a tapered shape such that a circumferential dimension thereof increases toward a radially outer side.

5. The rotor as set forth in claim 1, further comprising a cover member assembled to an axial end of the core, wherein
the additional-function portions comprise a cover-fixing portion for fixing the cover member to the core.

6. The rotor as set forth in claim 5, wherein
the cover-fixing portion has a bolt insertion hole formed to axially penetrate the cover-fixing portion, and
the cover member is fastened to the core by a through-bolt inserted in the bolt insertion hole and a nut screwed on the through-bolt.

7. A rotating electric machine comprising:
an annular stator; and
a rotor provided inside the stator,
wherein
the rotor includes a rotating shaft, a core provided on the rotating shaft so as to be rotatable together with the rotating shaft, and a Halbach array magnet fixed to the core,
the Halbach array magnet has a plurality of first magnet portions each having its magnetization direction oriented along a radial direction and a plurality of second magnet portions each having its magnetization direction oriented along a circumferential direction, the first magnet portions and the second magnet portions being alternately arranged in the circumferential direction,
the core has a tubular shaft-fixed portion fixed to the rotating shaft, a tubular yoke portion located radially outside the shaft-fixed portion and radially inside the Halbach array magnet to form a magnetic path, and a plurality of connection portions extending radially outward from the shaft-fixed portion so as to be connected with the yoke portion,
the connection portions are arranged in the circumferential direction with gaps formed therebetween, and
on an inner circumferential surface of the yoke portion, there are formed additional-function portions to extend radially inward from the inner circumferential surface of the yoke portion, each of the additional-function portions being located radially inside a corresponding one of the second magnet portions and having an additional function in addition to a function of forming the magnetic path, and
wherein a virtual line drawn in the radial direction through each of the connection portions passes through the second magnet portions and does not pass through the first magnet portions.

8. The rotor as set forth in claim 1, wherein
a circumferential dimension of each of the second magnet portions is smaller than a circumferential dimension of each of the first magnet portions.

9. The rotating electric machine as set forth in claim 7, wherein
a circumferential dimension of each of the second magnet portions is smaller than a circumferential dimension of each of the first magnet portions.

* * * * *